US 7,683,998 B2

(12) United States Patent
Lee

(10) Patent No.: US 7,683,998 B2
(45) Date of Patent: Mar. 23, 2010

(54) LIQUID CRYSTAL DISPLAY DEVICE WITH SLITS IN THE PIXEL ELECTRODE HAVING A CURVILINEAR SHAPE

(75) Inventor: Doyoung Lee, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 436 days.

(21) Appl. No.: 11/317,920

(22) Filed: Dec. 23, 2005

(65) Prior Publication Data

US 2007/0002247 A1 Jan. 4, 2007

(30) Foreign Application Priority Data

Jun. 29, 2005 (KR) ...................... 10-2005-0057257

(51) Int. Cl.
*G02F 1/1337* (2006.01)
*G02F 1/1343* (2006.01)
(52) U.S. Cl. ...................................... 349/141; 349/129
(58) Field of Classification Search ................. 349/141, 349/139–152, 129
See application file for complete search history.

(56) References Cited

U.S. PATENT DOCUMENTS

2004/0046918 A1* 3/2004 Song ......................... 349/141
2005/0068483 A1* 3/2005 Lee et al. ..................... 349/141
2006/0146248 A1* 7/2006 Park ............................ 349/141
2006/0146252 A1* 7/2006 Kang et al. .................. 349/141

* cited by examiner

*Primary Examiner*—David Nelms
*Assistant Examiner*—Jessica M Merlin
(74) *Attorney, Agent, or Firm*—Brinks Hofer Gilson & Lione

(57) ABSTRACT

A liquid crystal display (LCD) device includes a gate line and a data line defining a unit pixel. A thin film transistor (TFT) is connected to the gate line and the data line. A common electrode and a pixel electrode is connected to the TFT. The pixel electrode includes a plurality of shaped slits exposing the common electrode. One or more of the slits include at least one curved end or shaped in the form of two curvilinear sides joined to form pointed ends defined by a predetermined acute angle. A middle portion of the unit pixel defines an axis of symmetry around which slits are symmetrically disposed in either a first domain or a second domain. A common line, electrically connected to the common electrode, may define the axis of symmetry. The LCD device can reduce disclination line generation and can provide improved brightness, contrast ratio and image quality.

19 Claims, 6 Drawing Sheets

DISCLINATION LINE GENERATION

US 7,683,998 B2

LIQUID CRYSTAL DISPLAY DEVICE WITH SLITS IN THE PIXEL ELECTRODE HAVING A CURVILINEAR SHAPE

This application claims the benefit of priority under 35 U.S.C. § 119 to Korean Patent Application No. 057257/2005, filed Jun. 29, 2005, which is incorporated by reference in its entirety herein.

FIELD OF THE INVENTION

The present invention relates to a liquid crystal display device, and more particularly, to a liquid crystal display device providing improved image quality.

BACKGROUND

Cathode ray tubes (CRTs) have been widely used in display devices to display image information on a screen. However, because CRTs are heavy and bulky, their use is being increasingly supplanted by slim, lightweight, low power-consuming liquid crystal display devices (LCDs) providing high brightness and large screens at low prices. Compared to other display devices, including CRTs, LCDs provide high resolution and rapid response times when displaying moving images.

An LCD relies on optical anisotropy and polarizability of liquid crystal molecules to produce an image. Liquid crystal molecules are aligned with directional characteristics resulting from their long, thin shapes. These directional characteristic can be artificially controlled by applying an electric field to the liquid crystal molecules. By changing the arrangement of the liquid crystal molecules as light is transmitted therethrough, an appropriate image can be displayed.

Twisted nematic (TN) mode LCDs are among the most widely used LCDs. In a TN mode LCD, electrodes are installed on each of two substrates and a director of liquid crystals is twisted at 90°. When a voltage is applied, the director of liquid crystals is driven. A principal disadvantage of TN mode LCDs is that they often provide narrow viewing angles.

To address the narrow viewing angle problem, in-plane switching mode LCDs (IPS-LCDs) and fringe field switching mode LCDs (FFS-LCDs) have been developed. An FFS-LCD can provide a wide viewing angle and improved transmittance compared to an IPS-LCD. In an FFS-LCD, common electrodes and pixel electrodes are formed from a transparent conductive material. A narrower gap is formed between the common electrodes and pixel electrodes than in the top and bottom substrates. Therefore, a fringe field is formed between the common electrodes and the pixel electrodes, driving the liquid crystal molecules at upper portions of the electrodes.

FIG. 1 is a plan view of a related art FFS-LCD depicting a gate line 102 intersecting a data line 104 to define a unit pixel. A thin film transistor (TFT) is formed at a crossing between the gate line 102 and the data line 104. A common electrode 105 is formed from a transparent conductive material and is disposed on an entire surface of the bottom substrate. The common electrode 105 is electrically connected to a common line 107 and can continuously receive common signals therefrom. The pixel electrode 108 is also formed of a transparent material and is overlapped by the common electrode 105 and an insulation layer (not shown). The insulation layer is interposed between the pixel electrode 108 and the common electrode 105. The pixel electrode 108 includes a plurality of slits 108a spaced from one another at a predetermined distance. The common electrode 105 is exposed by the slits 108a.

Although not shown, the top substrate facing the bottom substrate has a broader gap therebetween compared to the gap between the pixel electrode 108 and the common electrode 105. A liquid crystal layer is interposed between the top and bottom substrates. The electrode structure pattern formed from the transparent conductive material in the pixel electrode 108 of an FFS-LCD is designed to reduce color shift.

FIG. 2 is a plan view of another related art FFS-LCD, identifying common or similar features according to the reference numbers identified in FIG. 1. In FIG. 2, a plurality of slits 108a is arranged in a comb pattern on the pixel electrode 108 forming two domains of equidistant-spaced slits 108a.

FIG. 3 is an enlarged view illustrating an end portion A in the pixel electrode 108 of FIG. 2. FIG. 4 is a picture illustrating brightness of the end portion A in the pixel electrode 108 of FIG. 2.

As illustrated in FIGS. 3 and 4, when power is applied to the common electrode 105 and the pixel electrode 108, a multi-directional electric field is generated at the end portion A of the pixel electrode 108. The multi-directional electric field produces a reverse twist region, characterized by multiple rotational directionalities among the liquid crystal molecules. This generates a disclination line. As a result of the disclination line, there is reduced brightness in an end portion of the pixel electrode, as well as reduced contrast ratio. Accordingly, the disclination line results in a reduced aperture ratio in the pixel area and reduced image quality.

SUMMARY

In one aspect, a liquid crystal display (LCD) device includes a gate line and a data line of a unit pixel. A thin film transistor (TFT) is connected to the gate line and the data line. A common electrode and a pixel electrode are connected to the TFT. The pixel electrode includes a plurality of slits exposing the common electrode, including one or more slits having at least one curved end. The slits may be shaped in the form of two curvilinear sides joined at a top pointed end and a bottom pointed end. Each of the two pointed ends is defined by a predetermined acute angle. In each slit, the pointed ends may be symmetrically oriented in opposite directions relative to one another.

In another aspect, a middle portion of the unit pixel defines an axis of symmetry around which the one or more slits are symmetrically disposed in either a first domain or a second domain. The slits may be slanted according to a predetermined inclination angle relative to the axis of symmetry. The LCD may further include a common line connected to the common electrode. The common line may define the axis of symmetry.

In a preferred embodiment, the first domain includes slits slanted toward the top end of the pixel electrode from left to right and the second domain includes slits slant toward the top end of the pixel electrode from right to left.

In a further aspect, a method for fabricating an LCD device according to the present disclosure is provided herein as disclosed.

DETAILED DESCRIPTION

Figure 5:
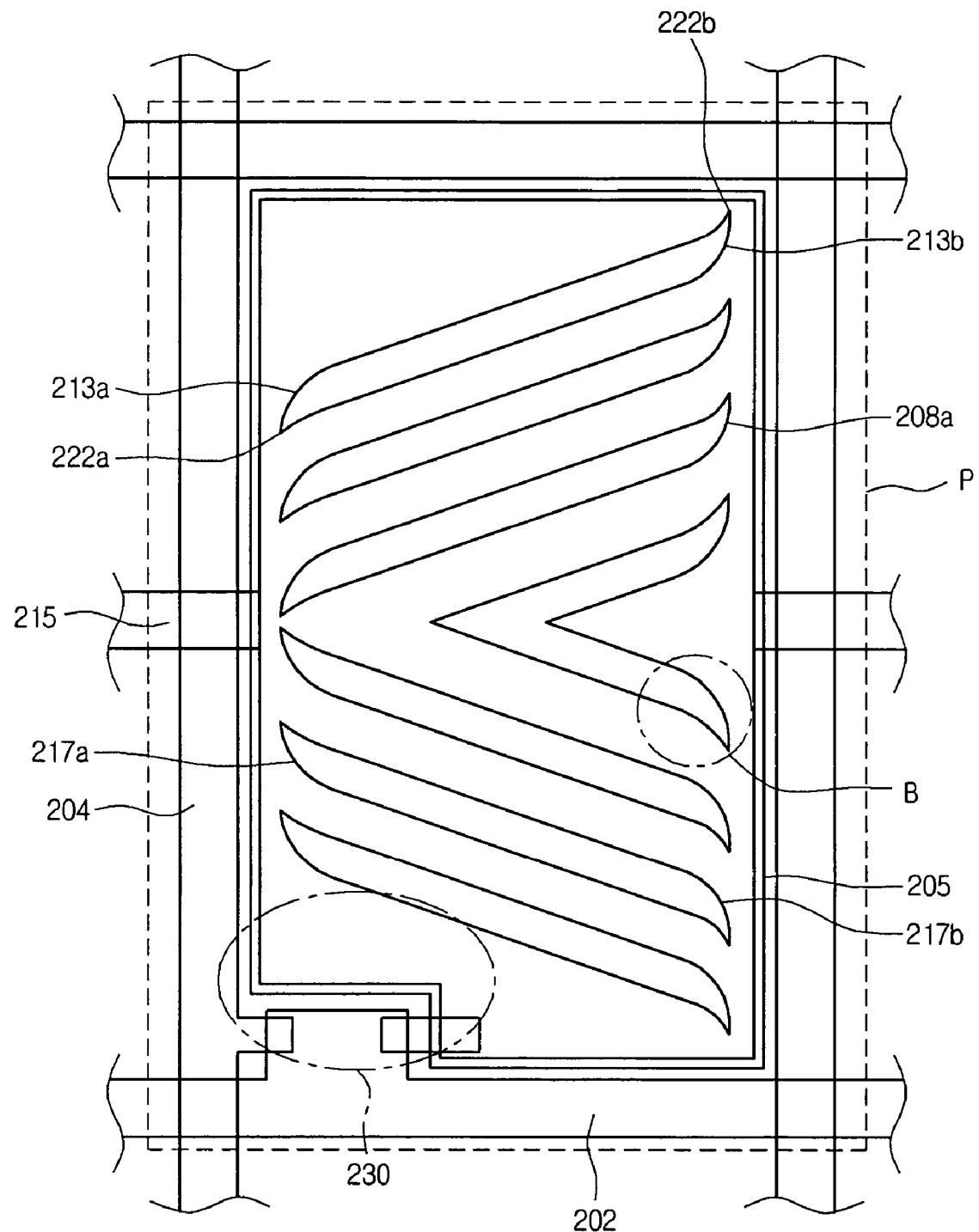
FIG. 5 is a plan view of a FFS-LCD according to an embodiment of the present invention.

FIG. 5 is a plan view of a fringe field switching mode LCD (FFS-LCD) according to an embodiment of the present invention. In FIG. 5, a pair of gate lines 202 intersecting a pair of data lines 204 on a bottom substrate define a unit pixel P. A thin film transistor (TFT) 230 is formed at a crossing between the gate line 202 and the data line 204. A common line 215 is formed parallel to a pair of gate lines 202, intersecting a middle portion of unit pixel P. The common line 215 and gate lines 202 can be formed from the same material on the same layer using the same process.

A common electrode 205 is formed from a transparent conductive material and is disposed on an entire surface of the bottom substrate. The common electrode 205 is electrically connected to a common line 215 and can continuously receive common signals therefrom. The pixel electrode 208 is also formed from a transparent conductive material and is overlapped by the common electrode 205 and an insulation layer (not shown). The insulation layer is interposed between the pixel electrode 208 and the common electrode 205. The pixel electrode 208 includes a plurality of slits 208a spaced from one another at a predetermined distance. The common electrode 205 is exposed by the slits 208a. The pixel electrode 208 contacts a drain electrode in the TFT 230 in a predetermined region.

As depicted in FIG. 5, the slits 208a have curvilinear ends arranged at predetermined inclination angle(s) relative to the common line 215. The common line 215 defines an axis of symmetry around which the plurality of slits 208a is arranged in two domains. To the left of the common line 215 where the TFT 230 is disposed, the curvilinear slit ends slope upward from left to right toward a top side of the pixel electrode 208 (see e.g., 217a), while sloping downward from right to left toward a bottom side of the pixel electrode (see e.g., 217b). In contrast, to the right of the common line 215 opposite of the TFT 230, the curvilinear slit ends slope upward from right to left toward a top side of the pixel electrode 208 (see e.g., 213a), while sloping downward from left to right toward a bottom side of the pixel electrode (see e.g., 213b). As a result, in contrast to slit ends in the related art, which have additional sides and/or corners, the above described slit ends terminate in a single point (see e.g., 222a, 222b), defined by a single acute angle.

In the above described FFS-LCD, when no power is applied, the major axes of liquid crystal molecules are initially arranged according to the rubbing axes. When power is applied, an electric field forms between the common electrode 205 and the pixel electrode 208. Since a gap between the top and bottom substrates is larger than the gap between the common electrode 205 and the pixel electrode 208 (e.g., a thickness of an insulation layer such as gate insulation layer), a vertically-directed fringe field is formed between the common electrode 205 and the pixel electrode 208.

Figure 1:
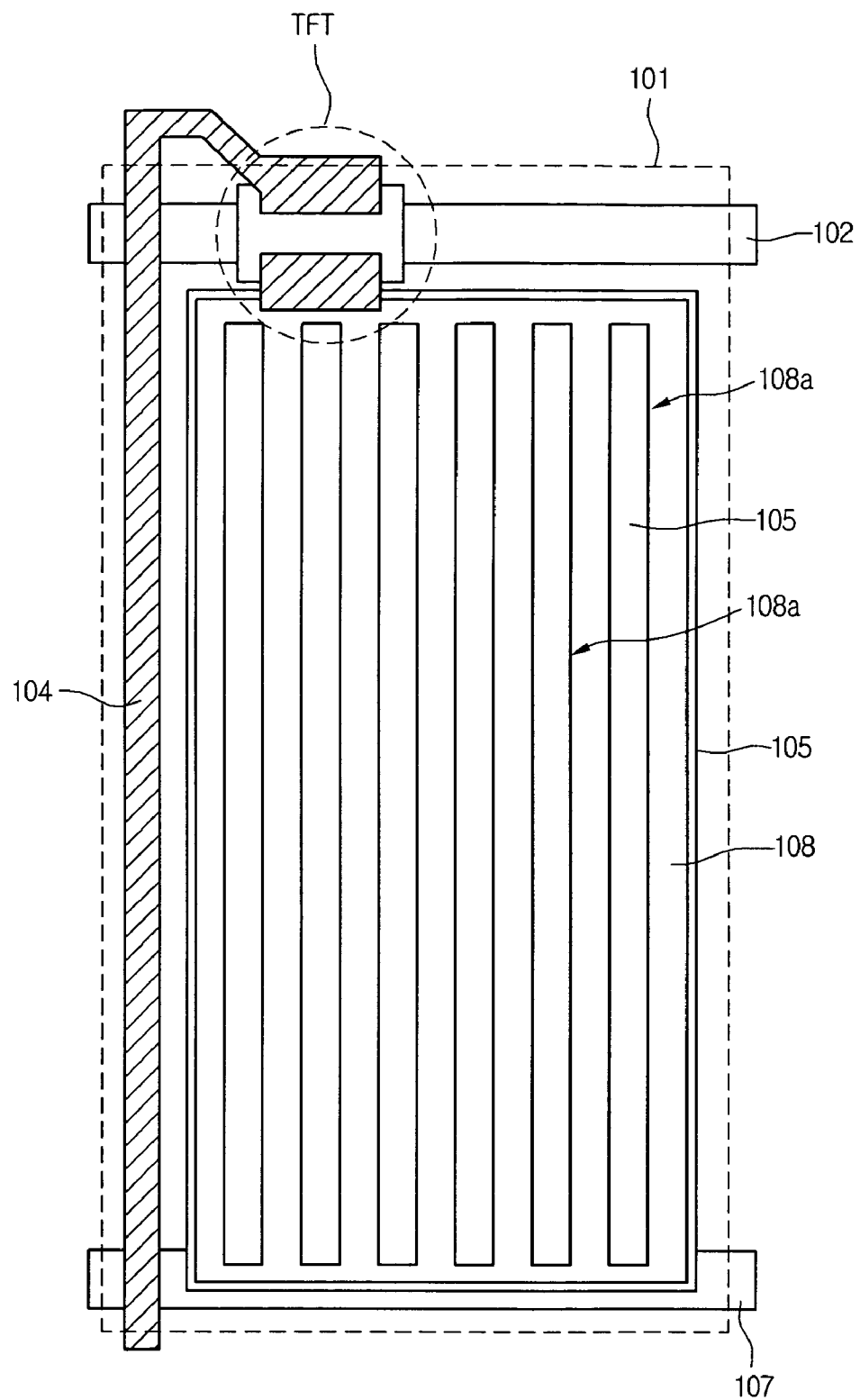
FIG. 1 is a plan view of a related art FFS-LCD.
Figure 2:
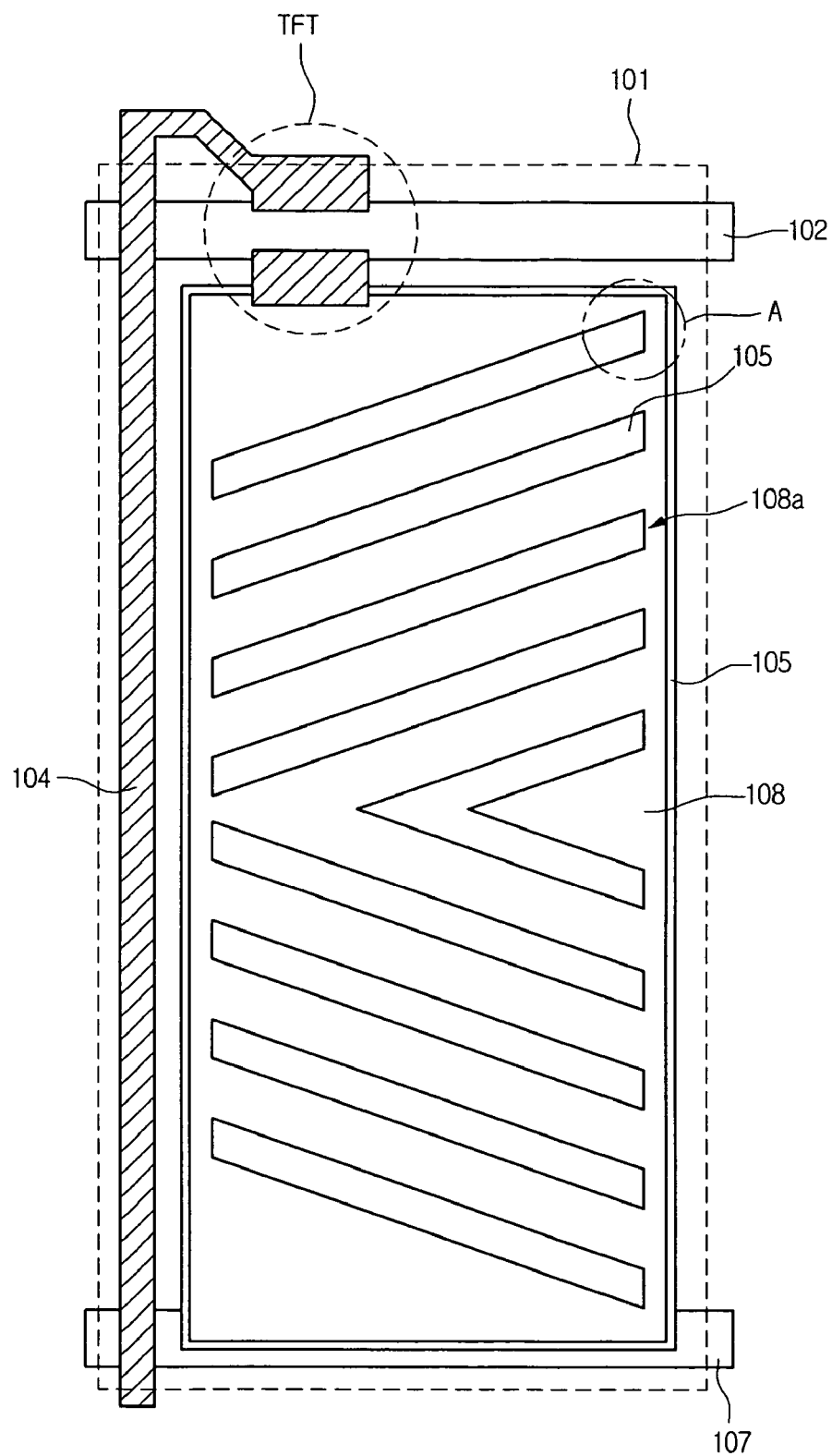
FIG. 2 is a plan view of a related art FFS-LCD.
Figure 3:
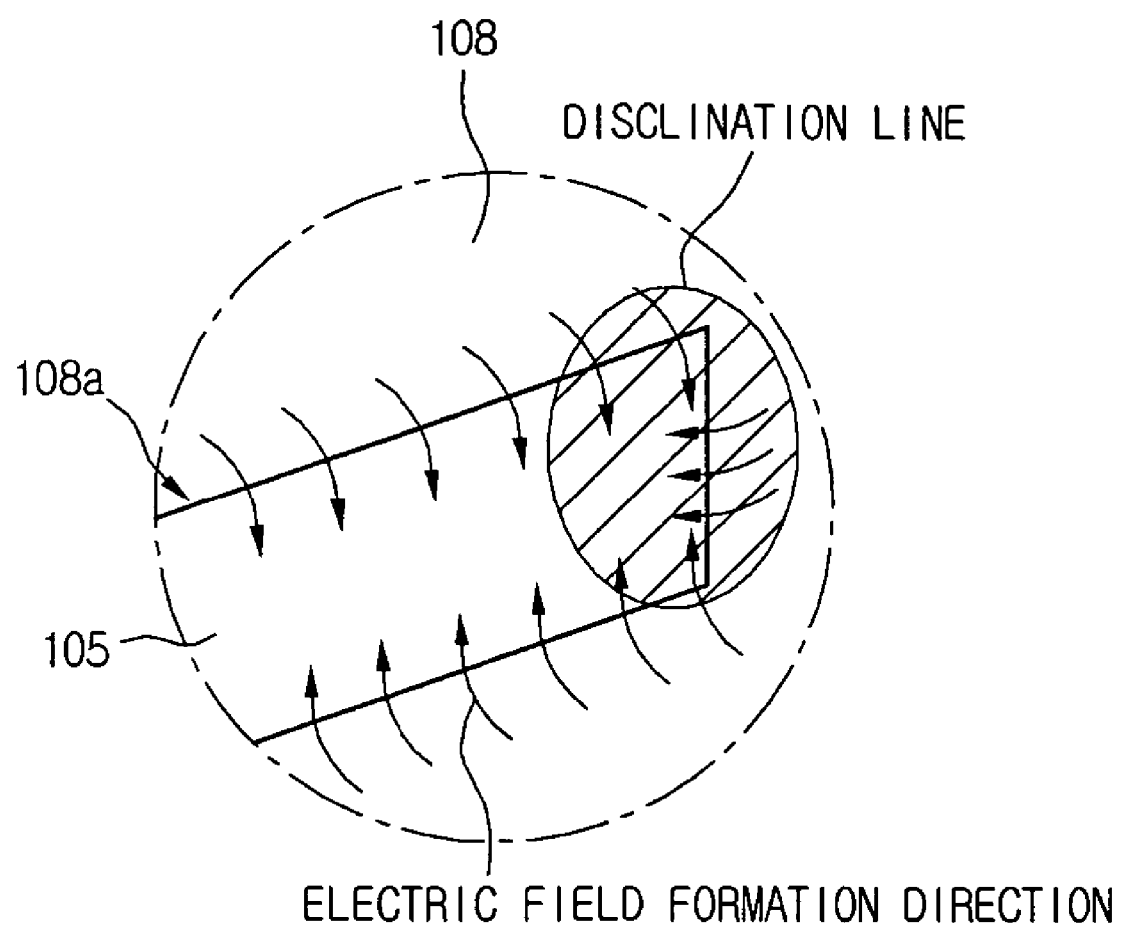
FIG. 3 is an enlarged view illustrating an end portion A in a pixel electrode of FIG. 2.

The fringe field affects top portions of the common electrode 205 and the pixel electrode 208, driving liquid crystal molecules toward the top of the common electrode 205 and the pixel electrode 208. In FIG. 5, for example, curvilinear end portions 213a and 213b terminate in single pointed ends 222a and 222b, respectively, in contrast to the related art (of e.g., FIGS. 2-3) in which the slit end has multiple sides and thus multiple corners. Pointed ends 222a, 222b include acute angles, which are increasingly slanted toward the slit ends.

Figure 6:
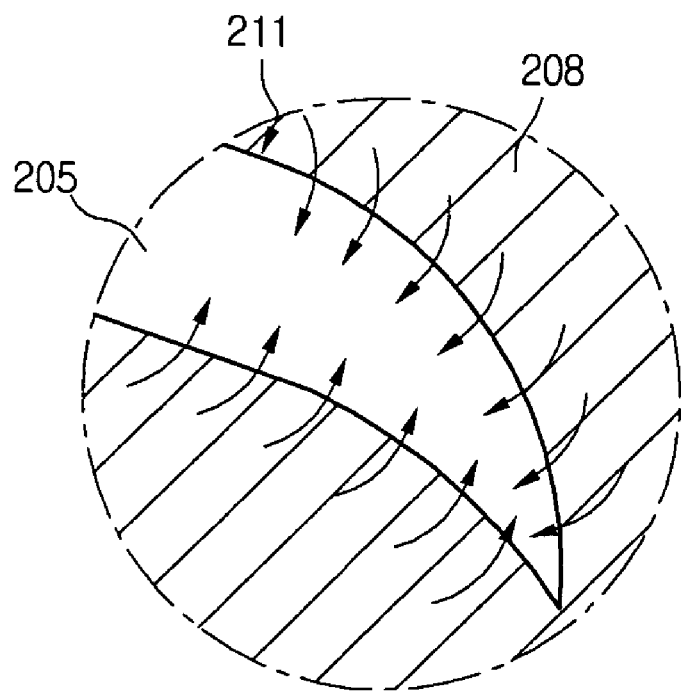
FIG. 6 is an enlarged view illustrating an end portion B in a pixel electrode of FIG. 5.

FIG. 6 is an enlarged view illustrating an end portion B in a pixel electrode of FIG. 5. As a consequence of the pointed ends, liquid crystal molecules are rotated according to the direction in which the end portions are slanted. That is, unlike liquid crystal molecules in the related art rotating in multiple directions (see e.g., FIG. 3), rotation of the liquid crystal molecules herein primarily rotate in a parallel direction. Moreover, since the rotational directionalities in the slit 208a end portions represented by 213a, 213b, 217a and 217b are substantially identical to the rotational directionalities in the slit 208a middle portions, the fringe field in an end portion of a slit 208a is substantially identical to the fringe filed in a middle portion of a slit 208a. Thus, a disclination generation region can be minimized.

Figure 4:
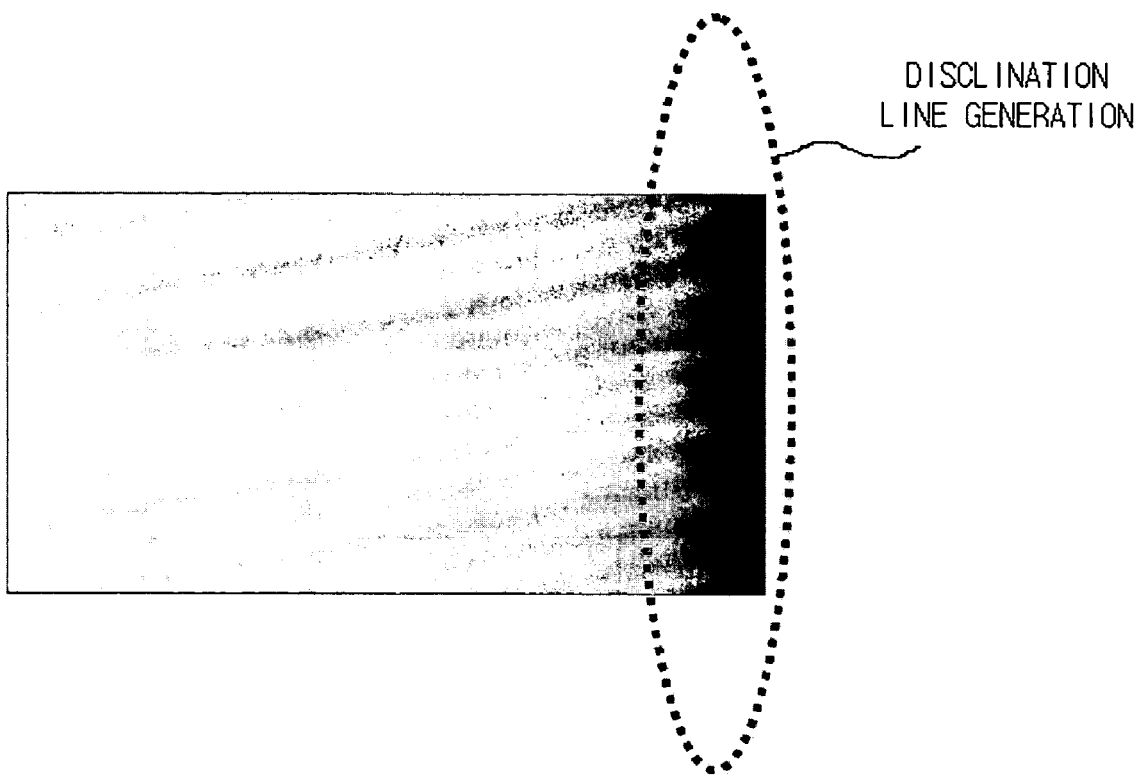
FIG. 4 is a picture illustrating brightness in an end portion A in a pixel electrode of FIG. 2.
Figure 7:
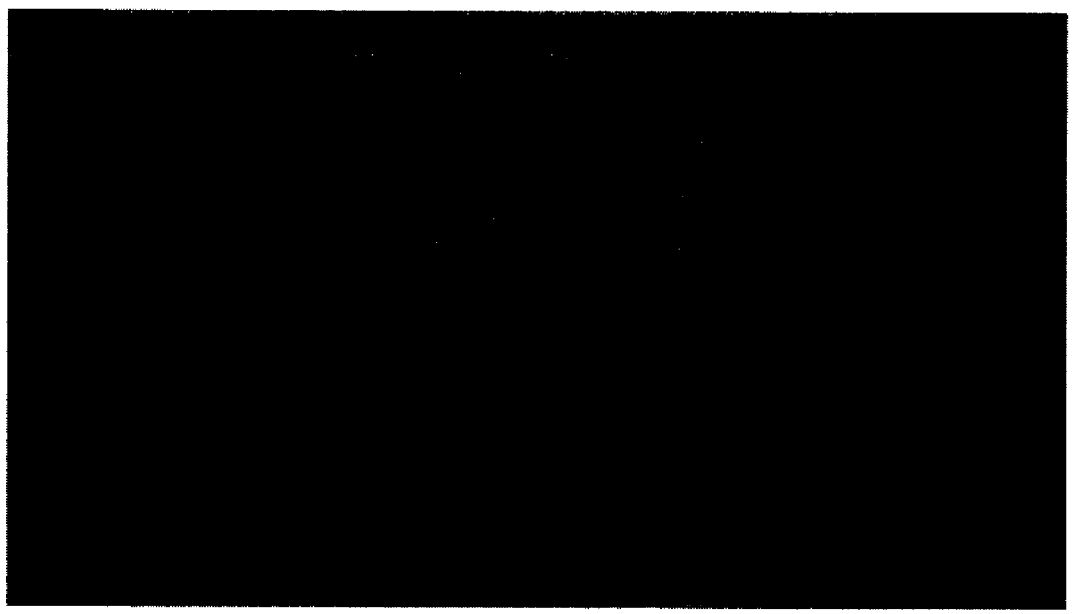
FIG. 7 is a picture illustrating brightness in an end portion B in a pixel electrode of FIG. 5.

FIG. 7 is a picture illustrating brightness in end portion B of the pixel electrode depicted in FIG. 5. As illustrated in FIG. 7, when the display is driven to provide a full white display, a reduced disclination line is generated in end portions 213a, 213b, 217a and 217b of the pixel electrode 208 as compared to the end portion of the related art slit carrying an extra side as depicted in FIG. 4. Accordingly, by retaining more brightness in the end portion, an increased contrast ratio and improved image quality are obtained.

Although the present invention has been explained by the embodiments shown in the drawings described above, it should be understood that the invention is not limited to the embodiments, and that various changes or modifications are possible without departing from the spirit or scope of the invention. Accordingly, it is intended that the present invention cover such modifications and variations provided they come within the scope of the appended claims and their equivalents.

What is claimed is:

1. A liquid crystal display device, comprising:
a gate line and a data line of a unit pixel;
a thin film transistor (TFT) connected to the gate line and the data line;
a common electrode formed in the whole region of the unit pixel; and
a pixel electrode connected to the TFT;
wherein the pixel electrode comprises a plurality of slits, the common electrode being exposed the same size as that of each slit; and
wherein each slit has first and second end portions, each end portion terminated to an edge defined by a single acute angle and having a curvilinear shape such that a direction of a fringe field at each of the first and second end portions of each slit is substantially identical to a direction of a fringe field at a middle portion of each slit, the first end being disposed to incline a first direction and the second end being disposed to incline a second direction opposing to the first direction.

2. The device according to claim 1, wherein the middle portion of the unit pixel defines an axis of symmetry around which the slits are symmetrically disposed in either a first domain or a second domain.

3. The device according to claim 2, wherein slits are slanted according to a predetermined inclination angle relative to the axis of symmetry.

4. The device according to claim 2, wherein the first domain comprises one or more slits slanted toward the top end of the pixel electrode from left to right and the second domain comprises one or more slits slant toward the top end of the pixel electrode from right to left.

5. The device according to claim 1, wherein the first and second end portions ends in each of the one or more slits is symmetrically oriented in opposite directions relative to one another.

6. The device according to claim 5, wherein each of the first and second end portions in the one or more slits is defined by a substantially equivalent angle.

7. The device according to claim 2, wherein the first domain comprises a plurality of slits having first end portions sloping upward to the right and having second end portions sloping downward to the left and wherein the second domain comprises a plurality of slits having first end portions sloping upward to the left and having second end portions sloping downward to the right.

8. The device according to claim 1, further comprising a common line electrically connected to the common electrode.

9. The device according to claim 8, wherein the common line defines the axis of symmetry around which the slits are symmetrically disposed in either a first domain or a second domain, the common line intersecting the middle portion of the unit pixel in a parallel direction relative to the gate line.

10. The device according to claim 1, wherein each of the pixel electrode and the common electrode is formed from the same material.

11. The device according to claim 10, wherein the material is a transparent conductive material.

12. The device according to claim 1, further comprising an insulation layer between the common electrode and the pixel electrode.

13. A method of fabricating a liquid crystal display device, comprising:
    forming a unit pixel comprising a gate line and a data line;
    disposing a thin film transistor (TFT) at a crossing of the gate line and the data line;
    forming a common electrode formed in the whole region of the unit pixel; and
    forming a pixel electrode comprising a plurality of slits, the common electrode being exposed the same size as that of each slit, and
    wherein each slit has first and second end portions, each end portion terminated to an edge defined by a single acute angle and having a curvilinear shape such that a direction of a fringe field at each of the first and second end portions of each slit is substantially identical to a direction of a fringe field at a middle portion of each slit, the first end being disposed to incline a first direction and the second end being disposed to incline a second direction opposing to the first direction.

14. The method of claim 13, comprising forming the plurality of slits around an axis of symmetry in a middle portion of the pixel electrode, thereby defining a first domain and a second domain.

15. The method of claim 14, comprising forming slits to be slanted in the first domain toward the first end of the pixel electrode from left to right and forming slits to be slanted in the second domain toward the first end of the pixel electrode from right to left.

16. The method of claim 15, comprising forming the first and second ends in a plurality of slits to be symmetrically oriented in opposite directions relative to one another.

17. The method of claim 13, further comprising disposing a common line to intersect a middle portion of the unit pixel in a parallel direction relative to the gate line and electrically connecting the common line to the common electrode.

18. The method of claim 13, further comprising disposing an insulation layer between the common electrode and the pixel electrode.

19. The method of claim 13, comprising forming the pixel electrode and the common electrode from a transparent conductive material.

* * * * *

UNITED STATES PATENT AND TRADEMARK OFFICE
CERTIFICATE OF CORRECTION

PATENT NO.         : 7,683,998 B2                                    Page 1 of 1
APPLICATION NO.    : 11/317920
DATED              : March 23, 2010
INVENTOR(S)        : Doyoung Lee It is certified that error appears in the above-identified patent and that said Letters Patent is hereby corrected as shown below:

In the Claims

In column 5, claim 5, line 2, after "second end portions" delete "ends".

Signed and Sealed this

Third Day of August, 2010

David J. Kappos
*Director of the United States Patent and Trademark Office*